(12) United States Patent
Yoshida

(10) Patent No.: US 10,585,338 B2
(45) Date of Patent: Mar. 10, 2020

(54) DISPLAY DEVICE

(71) Applicant: SEIKO EPSON CORPORATION, Tokyo (JP)

(72) Inventor: Shohei Yoshida, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/224,859

(22) Filed: Dec. 19, 2018

(65) Prior Publication Data

US 2019/0187541 A1 Jun. 20, 2019

(30) Foreign Application Priority Data

Dec. 20, 2017 (JP) .................. 2017-244086

(51) Int. Cl.
*G03B 21/14* (2006.01)
*G02B 5/10* (2006.01)
*G02B 27/01* (2006.01)

(52) U.S. Cl.
CPC ............ *G03B 21/142* (2013.01); *G02B 5/10* (2013.01); *G02B 27/0172* (2013.01); *G02B 2027/0118* (2013.01)

(58) Field of Classification Search
CPC ... G03B 21/142; G02B 5/10; G02B 2027/011
USPC ........................................................ 353/85
See application file for complete search history.

(56) References Cited

U.S. PATENT DOCUMENTS

| 8,384,999 | B1 | 2/2013 | Crosby et al. | |
| 2003/0137731 | A1* | 7/2003 | Takahashi | G02B 27/2235 |
| | | | | 359/462 |
| 2011/0228403 | A1 | 9/2011 | Masuda et al. | |
| 2013/0077175 | A1 | 3/2013 | Hotta et al. | |
| 2016/0139412 | A1* | 5/2016 | Sawada | G02B 27/0172 |
| | | | | 359/630 |
| 2016/0282616 | A1 | 9/2016 | Matsushita | |

FOREIGN PATENT DOCUMENTS

| JP | 2011-191715 A | 9/2011 |
| JP | 2013-073070 A | 4/2013 |
| JP | 2016-099406 A | 5/2016 |
| JP | 2016-180871 A | 10/2016 |
| JP | 2017-049511 A | 3/2017 |

* cited by examiner

*Primary Examiner* — Jerry L Brooks
(74) *Attorney, Agent, or Firm* — Oliff PLC

(57) ABSTRACT

A display device according to the invention includes an image generating unit and a projection optical system. The projection optical system includes an optical element provided with a plurality of curved mirrors. The plurality of curved mirrors are arranged in a first direction so that the curved mirror positioned on a far side from the image generating unit has a greater inclination than that of the curved mirror positioned on a near side to the image generating unit. The plurality of curved mirrors include a curved mirror disposed in a position in a second direction equivalent to a thickness direction of the optical element that varies in the first direction.

6 Claims, 8 Drawing Sheets

DISPLAY DEVICE

BACKGROUND

1. Technical Field

The invention relates to a display device.

2. Related Art

In recent years, there have been provided display devices such as a head-up display and a head-mounted display that include a mirror array with a Fresnel structure. For example, JP-A-2011-191715 discloses a head-up display including an optical element provided with ridge portions constituting a Fresnel lens, each of the ridge portions having a different width. JP-A-2011-191715 sets forth that, with the widths of mutually adjacent ridge portions being different from each other, a diffraction effect of light as well as a fringe pattern that occurs in association with the diffraction effect are suppressed, making it possible to improve the ease of viewing in the head-up display.

The specification of U.S. Pat. No. 8,384,999 described below discloses a head-mounted display including an optical element provided with a plurality of curved mirrors. In the specification of U.S. Pat. No. 8,384,999, there is described an example of an optical element in which the plurality of curved mirrors are disposed on a curved face.

With a display device provided with an optical element of this type, the problem arises that arc-shaped and stripe-shaped patterns that occur due to differences in brightness are visually recognized by an observer. While JP-A-2011-191715 sets forth that the fringe pattern associated with the diffraction effect of light can be suppressed, countermeasures using the technique described in JP-A-2011-191715 are still inadequate when the above-described display failure of a mode that differs from the diffraction effect occurs. The technique in the specification of U.S. Pat. No. 8,384,999 is also not capable of solving the above-described problem.

SUMMARY

An advantage of some aspects of the invention is to provide a display device capable of reducing arc-shaped and stripe-shaped patterns caused by differences in brightness.

To achieve the advantage described above, a display device according to an aspect of the invention includes an image generating unit configured to emit light including image information, and a projection optical system configured to guide light from the image generating unit toward an exit pupil and generates an image by the light in a position of the exit pupil. Wherein, the projection optical system includes an optical element provided with a plurality of curved mirrors configured to reflect a portion of the light toward the exit pupil and transmit the other portion of the light. And, the plurality of curved mirrors are arranged in a first direction, and the plurality of curved mirrors are configured so that the curved mirror positioned on a far side from the image generating unit has an inclination greater than that of the curved mirror positioned on a near side to the image generating unit, and the plurality of curved mirrors include a curved mirror positioned at z ($\eta$) that satisfies equation (1) below, in a second direction equivalent to a thickness direction of the optical element:

$$Z(\eta)=1 \text{ mm}/\tan \beta[(\sin \eta_0 - \sin \eta)/\cos \eta_0 - (\eta_0 - \eta)] \quad (1)$$

where, $\beta$: Refraction angle of light on surface of optical element on observer side $\eta$: $\eta=\arcsin (\sin \theta/n)$ $\theta$: Exit angle of light from optical element n: Refractive index of medium of optical element $\eta_0$: $\eta$ in a position where $\theta$ is maximum in optical element According to the display device of an aspect of the invention, a ratio (hereinafter "duty ratio") of widths of a bright region and a dark region produced by light emitted from one curved mirror can be made substantially constant across the plurality of curved mirrors. As a result, the observer is less likely to visually recognize a striped-shaped pattern caused by differences in brightness having an arc shape. The reason that the striped-shaped pattern becomes difficult to perceive by an eye of the observer is described later.

It is preferable that the plurality of curved mirrors include a first curved mirror positioned at a center portion in the first direction, and a second curved mirror positioned at one end portion in the first direction, and a variation between a position of the first curved mirror in the second direction and a position of a curved mirror adjacent to the first curved mirror in the second direction is greater than a variation between a position of the second curved mirror in the second direction and a position of a curved mirror adjacent to the second curved mirror in the second direction.

According to this configuration, a height of a wall surface between the first curved mirror positioned at the center portion and the curved mirror adjacent to the first curved mirror is less than at least a height of a wall surface between the second curved mirror positioned at one end portion and a curved mirror adjacent to the second curved mirror. Thus, the width of the dark region inside the first curved mirror can be decreased to about the width of the dark region inside the second curved mirror. As a result, in the first curved mirror and the second curved mirror, the ratios of the widths of the bright region and the dark region can be made generally uniform, and the stripe-shaped pattern that appears in a center portion of the image when the position of the eye of the observer matches the center position of the optical element can be reduced.

It is preferable that the plurality of curved mirrors are sandwiched between a first transparent member and a second transparent member, and the first transparent member and the second transparent member include surfaces opposite to surfaces facing each other that are mutually parallel flat surfaces.

According to this configuration, light travels through interiors of the first transparent member and the second transparent member and enters the plurality of curved mirrors. At this time, when the surfaces of the first transparent member and the second transparent member are mutually parallel flat surfaces, an incident angle of light with respect to the curved mirror does not vary, even when the light is repeatedly reflected by these surfaces. This makes it possible to maintain an amount of light emitted from each of the curved mirrors toward the exit pupil.

It is preferable that the plurality of curved mirrors each include a partial reflection film configured to reflect a portion of the light, and transmit the other portion of the light.

According to this configuration, the characteristics of each of the curved mirrors, such as reflectance and transmittance, can be controlled by suitably adjusting the specifications of the partial reflection film.

It is preferable that the projection optical system further includes a concave mirror configured to reflect light from the image generating unit toward the optical element.

According to this configuration, an angle of the light that enters the optical element can be adjusted by suitably adjusting a shape of the concave mirror, making it easier to control a duty ratio of each curved mirror to a preferred value by introducing parallel light into the optical element, for example. Further, when a lens is used in the projection optical system, the lens has dispersion, resulting in problems such as chromatic aberration and/or an increase in device size. To address them, use of the concave mirror suppresses such chromatic aberration and/or makes it possible to achieve a small, light-weight display device.

It is preferable that the optical element and the concave mirror are made as an integrated member.

According to this configuration, it is possible to easily maintain an alignment accuracy of the optical element and the concave mirror.

BRIEF DESCRIPTION OF THE DRAWINGS

The invention will be described with reference to the accompanying drawings, wherein like numbers reference like elements.

DESCRIPTION OF EXEMPLARY EMBODIMENTS

An exemplary embodiment of the invention will be described below with reference to the accompanying drawings.

An image display device of the exemplary embodiment is an example of a head-mounted display that is used by mounting on the head of a user.

In the description below, the term "head-mounted display" is abbreviated "HMD".

Figure 1:
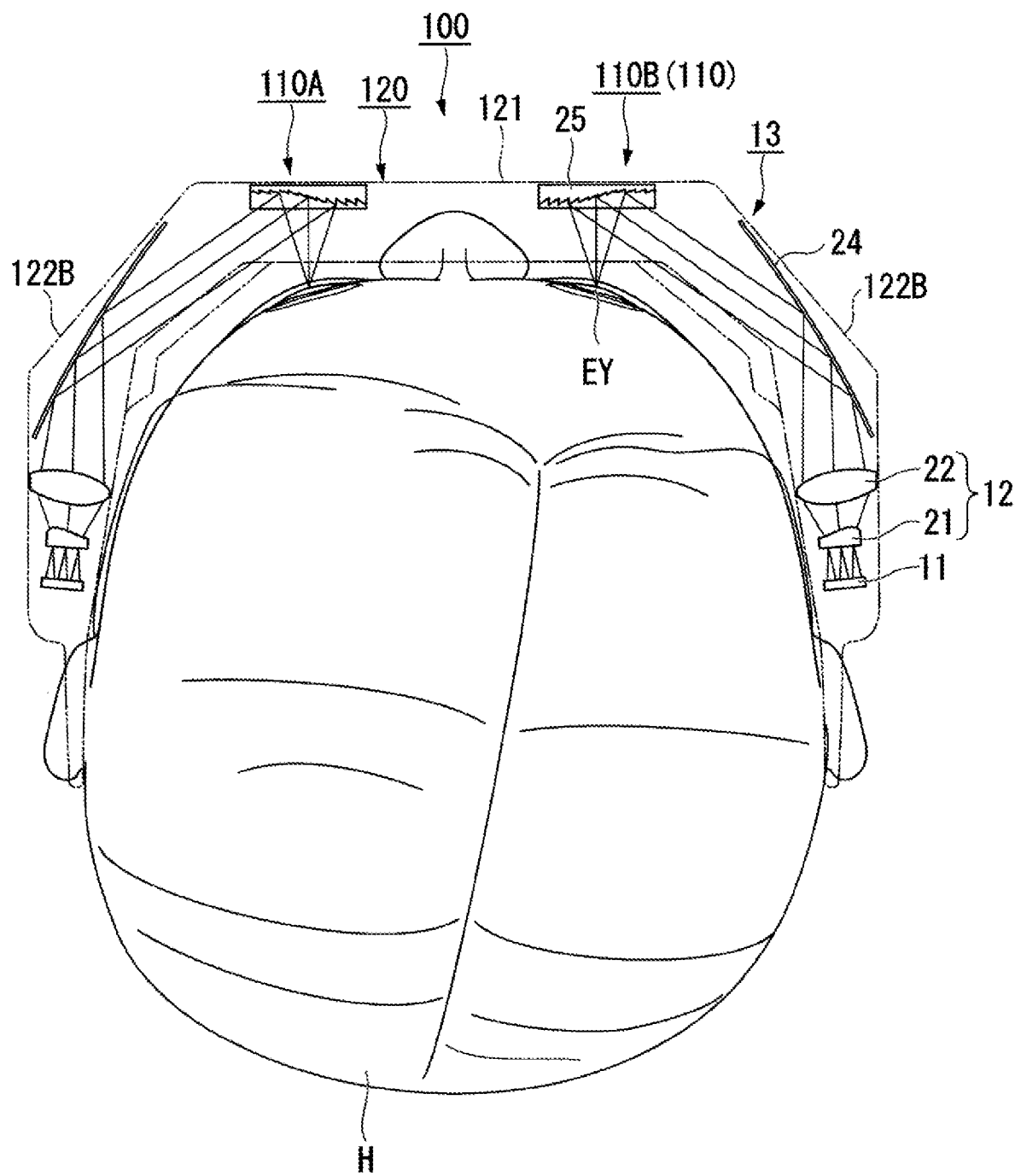
FIG. 1 is a plan view of a display device of an exemplary embodiment of the invention.
Figure 2:
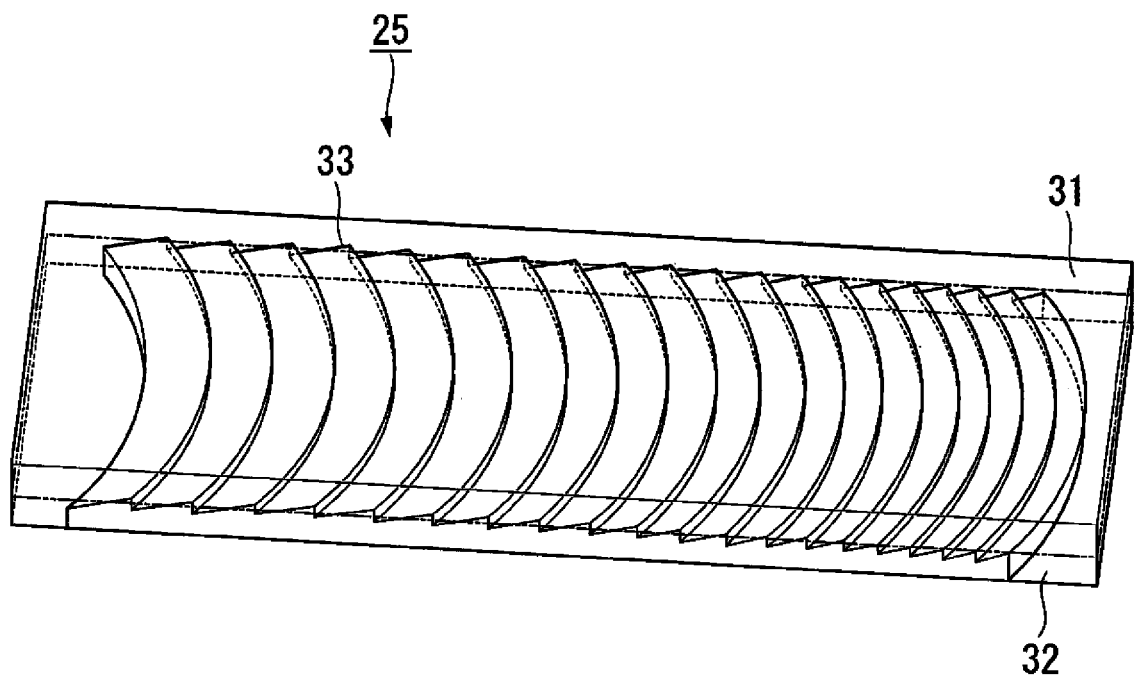
FIG. 2 is a perspective view of an optical element.
Figure 3:
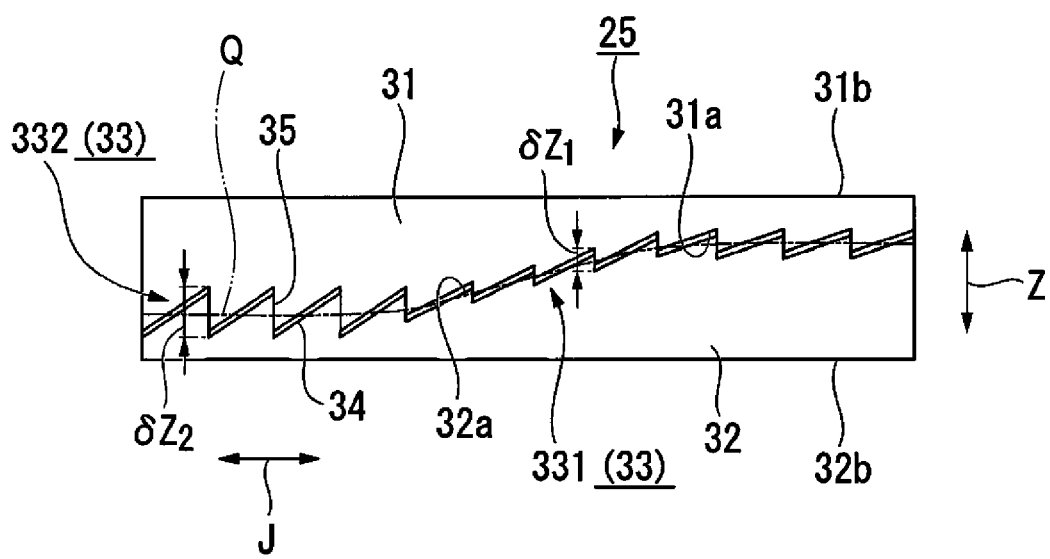
FIG. 3 is a plan view of the optical element.
Figure 4:
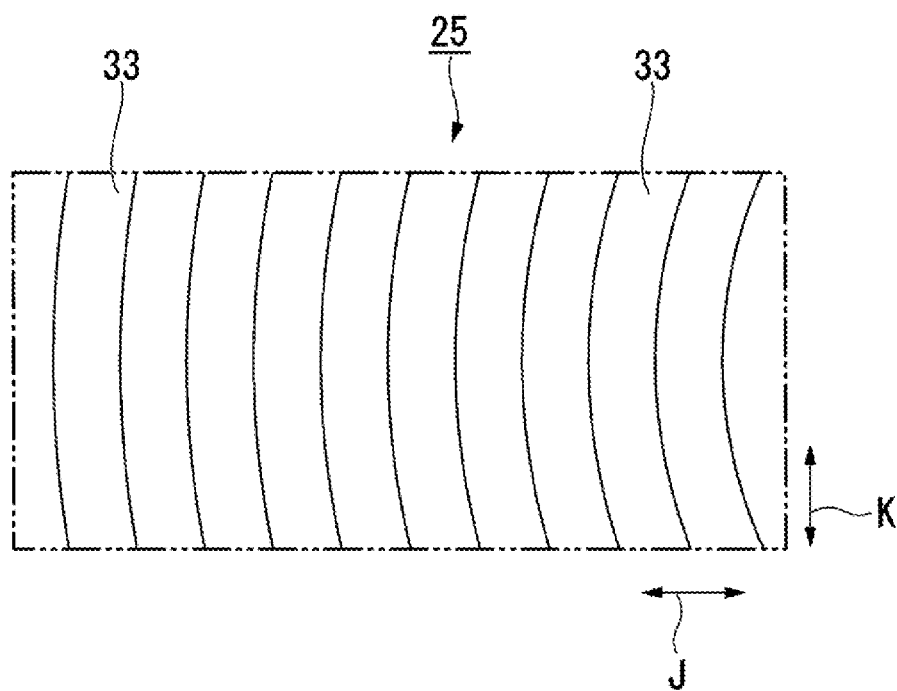
FIG. 4 is a front view of the optical element.

FIG. 1 is a plan view illustrating a user wearing the HMD of the exemplary embodiment. FIG. 1 illustrates the user wearing the HMD, as viewed from above the head. FIG. 2 is a perspective view of an optical element of the HMD. FIG. 3 is a plan view of the optical element. FIG. 4 is a front view of the optical element.

Note that, in each of the drawings below, constituent elements are illustrated on different dimensional scales to increase the visibility of each constituent element.

As illustrated in FIG. 1, an HMD 100 (display device) of the exemplary embodiment is used by mounting on the head of the user as if wearing glasses. The HMD 100 of the exemplary embodiment is a see-through (transparent) type HMD. As a result, according to the HMD 100 of the exemplary embodiment, the user can visually recognize an image generated by an image display unit and visually recognize the physical world, such as the scenery outside the HMD 100.

Note that, in the following, when the user mounts the HMD 100 onto his or her head, positions of each exit pupil of the HMD 100 respectively match the positions of the eyes of the user.

The HMD 100 includes a controller (not illustrated) having a size that can be held by the hand of the user. The HMD 100 and the controller need only be communicably connected in a wired or wireless manner, and are configured to communicate image signals and control signals.

The HMD 100 includes a frame 120, a left-eye image display unit 110A, and a right-eye image display unit 110B. The frame 120 includes a rim portion 121, and a pair of temple portions 122A and 122B for hooking the HMD 100 onto ears by the user. The right-eye image display unit 110B and the left-eye image display unit 110A have similar configurations, and the constituent elements inside both image display units are symmetrically disposed. Thus, in the following, the right-eye image display unit 110B is singly described in detail as an image display unit 110, and a description of the left-eye image display unit 110A is omitted.

The image display unit 110 includes an image generating unit 11, a correction optical system 12, and a projection optical system 13.

The image generating unit 11 includes a display panel such as a liquid crystal panel or an organic electroluminescent (EL) panel, for example. The image generating unit 11 emits light that includes image information. Additionally, the image generating unit 11 may include an optical scanning image generating means provided with laser light sources of a plurality of emission colors, a micro electro mechanical system (MEMS) mirror device, and the like.

The correction optical system 12 is provided between the image generating unit 11 and the projection optical system 13, and more specifically between the image generating unit 11 and a concave mirror 24. While, in this exemplary embodiment, the correction optical system 12 includes two lenses, namely a first correction lens 21 and a second correction lens 22, the number of correction lenses is not particularly limited. The correction optical system 12 corrects the image obtained by the light from the image generating unit 11, but does not necessarily need to be provided as long as correction is possible by adjustment of a shape and a curvature of the concave mirror 24, for example.

The projection optical system 13 includes the concave mirror 24, and an optical element 25. The projection optical system 13 guides the light from the image generating unit 11 toward the position of the exit pupil, and generates an image by the light from the image generating unit 11 at the position of the exit pupil, that is, at the position of the pupil of the observer. The concave mirror 24 reflects the light from the image generating unit 11 toward the optical element 25. In this exemplary embodiment, the light reflected by the concave mirror 24 is parallelized, and the parallel light enters the optical element 25.

The concave mirror 24 includes a partial reflection mirror that reflects a portion of the entered light, and transmits the other portion of the entered light. The partial reflection mirror is configured to include a partial reflection film on one surface of a transparent plate, such as plastic, for example. This partial reflection mirror has incident angle dependency that causes light having an incident angle greater than a predetermined angle to be reflected and thus deflected, and light having an incident angle less than the predetermined angle to be transmitted, the incident angle being formed with respect to a direction orthogonal to the one surface of the transparent plate.

The predetermined angle described above can be suitably adjusted by the design of the partial reflection film. The concave mirror 24 is disposed in an orientation that allows the light emitted from the image generating unit 11 to enter at a large incident angle and be reflected. Thus, when the observer views the concave mirror 24, ambient light having a small incident angle passes through the concave mirror 24 and reaches the pupil of the observer, allowing the observer to visually recognize the physical world.

The concave mirror 24, disposed in such an orientation, is positioned along the face. Thus, the concave mirror 24 also has the role of making an outer shape of the HMD 100 fit along the face, and contributes to decrease a size and enhance a designability of the display device 100. Further, the concave mirror 24 may reflect light on a per color basis using a dichroic mirror.

As illustrated in FIGS. 2 and 3, the optical element 25 includes a first transparent member 31, a second transparent member 32, and a plurality of curved mirrors 33. The plurality of curved mirrors 33 are sandwiched between the first transparent member 31 and the second transparent member 32. The first transparent member 31 includes a first surface 31a facing the second transparent member 32, and a second surface 31b (surface on the physical world side) opposite the first surface 31a, and the second surface 31b is a flat surface. Similarly, the second transparent member 32 includes a first surface 32a facing the first transparent member 31, and a second surface 32b (surface on the observer side) opposite the first surface 32a, and the second surface 32b is a flat surface. The second surface 31b of the first transparent member 31 and the second surface 32b of the second transparent member 32 are parallel to each other.

As illustrated in FIG. 4, when viewed from the eye of the observer, the plurality of curved mirrors 33 are arranged in one direction (direction of the arrow J) of the optical element 25. Each of the plurality of curved mirrors 33 has an arc shape with a center on an outer side of the optical element 25 in the arrangement direction J of the plurality of curved mirrors 33. The arcs that form the shapes of the plurality of curved mirrors 33 are all concentric.

As illustrated in FIG. 3, an interface where the first transparent member 31 and the second transparent member 32 come into contact with each other has a jagged, uneven shape. The plurality of curved mirrors 33 are correspondingly provided to a plurality of inclined faces of the uneven shape, the inclined surfaces being inclined with respect to the second surface 31b of the first transparent member 31. The curved mirror 33 includes a partial reflection film 34 configured to reflect a portion of the light, and transmit the other portion of the light. For the partial reflection film 34, a film such as a metal film including aluminum or the like, or a dielectric multilayer film is used. A plurality of wall surfaces 35 orthogonal to the second surface 31b of the first transparent member 31 may be provided with a film having light absorbability, or may be light-transmitting surfaces not provided with a film.

Each disposed position of the plurality of curved mirrors 33 in a thickness direction Z of the optical element 25 varies in the arrangement direction of the plurality of curved mirrors 33. Here, the position of each of the curved mirrors 33 is defined by a center position of the curved mirror 33 in FIG. 3. In this exemplary embodiment, the first transparent member 31 and the second transparent member 32 constitute parallel flat plates, and the position of each of the curved mirrors 33 corresponds to a distance from the second surface 31b of the first transparent member 31 (the second surface 32b of the second transparent member 32).

Among the plurality of curved mirrors 33, the curved mirror 33 on an end portion (left end in FIG. 3) on a far side from the image generating unit 11 is positioned on the second surface 32b side (observer side) of the second transparent member 32, and the curved mirror 33 on an end portion (right end in FIG. 3) on a near side to the image generating unit 11 is positioned on the second surface 31b side (physical world side) of the first transparent member 31. The positions of all other curved mirrors 33 vary in a curved shape. In FIG. 3, the curve that passes through the positions of each of the curved mirrors 33 is indicated by a double-dot chain line Q. Accordingly, the heights of the wall surfaces 35 vary in the arrangement direction J of the plurality of curved mirrors 33. Specifically, among the plurality of wall surfaces 35, the wall surface at the center is lower than the wall surfaces 35 on both sides.

Here, the problems of the optical element in the related art will be described.

Figure 12:
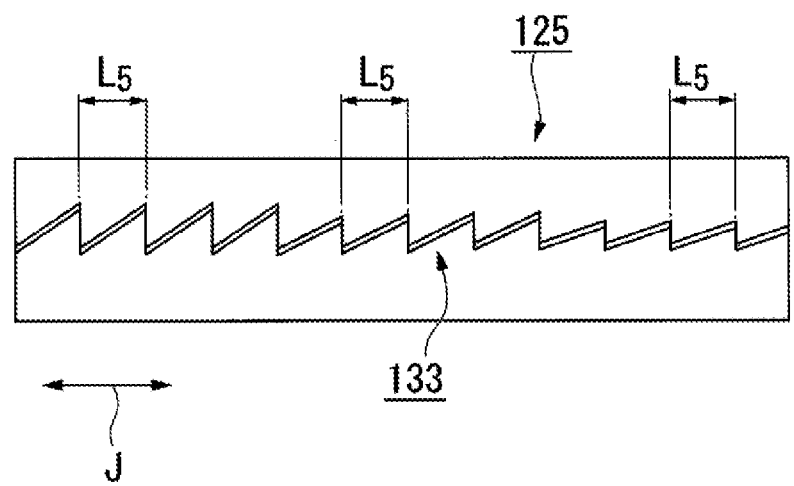
FIG. 12 is a plan view of the optical element in the related art.

FIG. 12 is a plan view of the optical element in the related art.

As illustrated in FIG. 12, in an optical element 125 in the related art, a pitch $L_5$ of a plurality of curved mirrors 133 is constant and not dependent on positions in the arrangement direction J of the plurality of curved mirrors 133.

Figure 5:
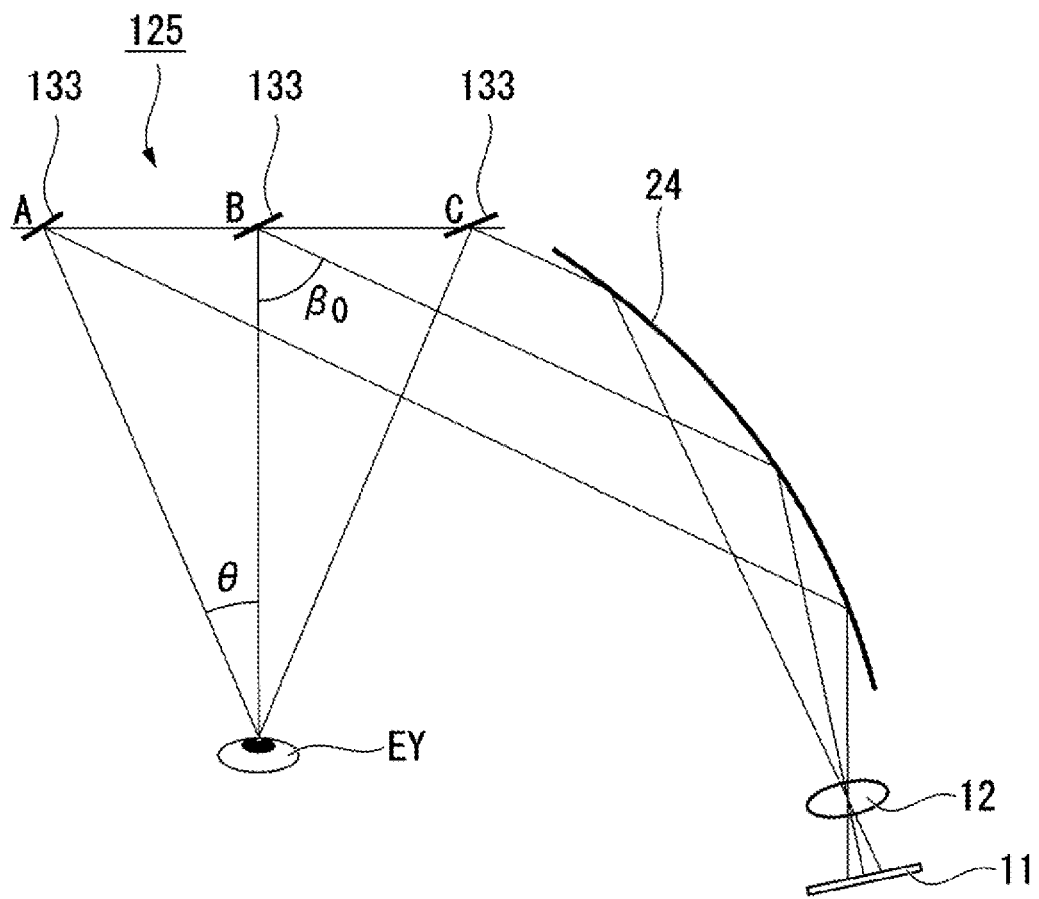
FIG. 5 is a schematic view for explaining an action of a plurality of curved mirrors.

FIG. 5 is a schematic view for explaining an action of the plurality of curved mirrors 133, and explains a behavior of light using three curved mirrors 133 among the plurality of curved mirrors 133 that differ in position in the arrangement direction J as representatives. The positions of the three curved mirrors 133 are referred to as position A, position B, and position C in order from the relatively far side from the image generating unit 11. In FIG. 5, the correction optical system 12 is illustrated with all but one lens omitted.

Similar to the exemplary embodiment, even in this example, the light parallelized by the concave mirror 24 presumably enters the optical element 125. Thus, as illustrated in FIG. 5, incident angles βO of the light that enters the optical element 125 at the positions of the three curved mirrors 133 are the same. However, the inclinations of the curved mirrors 133 increase in the order of the position C, the position B, and the position A, and thus the travel directions of the light reflected by each of the curved mirrors 133 and emitted from the optical element 125 mutually differ, and each light advances to the position of the exit pupil, that is, converges at an eye EY of the observer.

Figure 6:
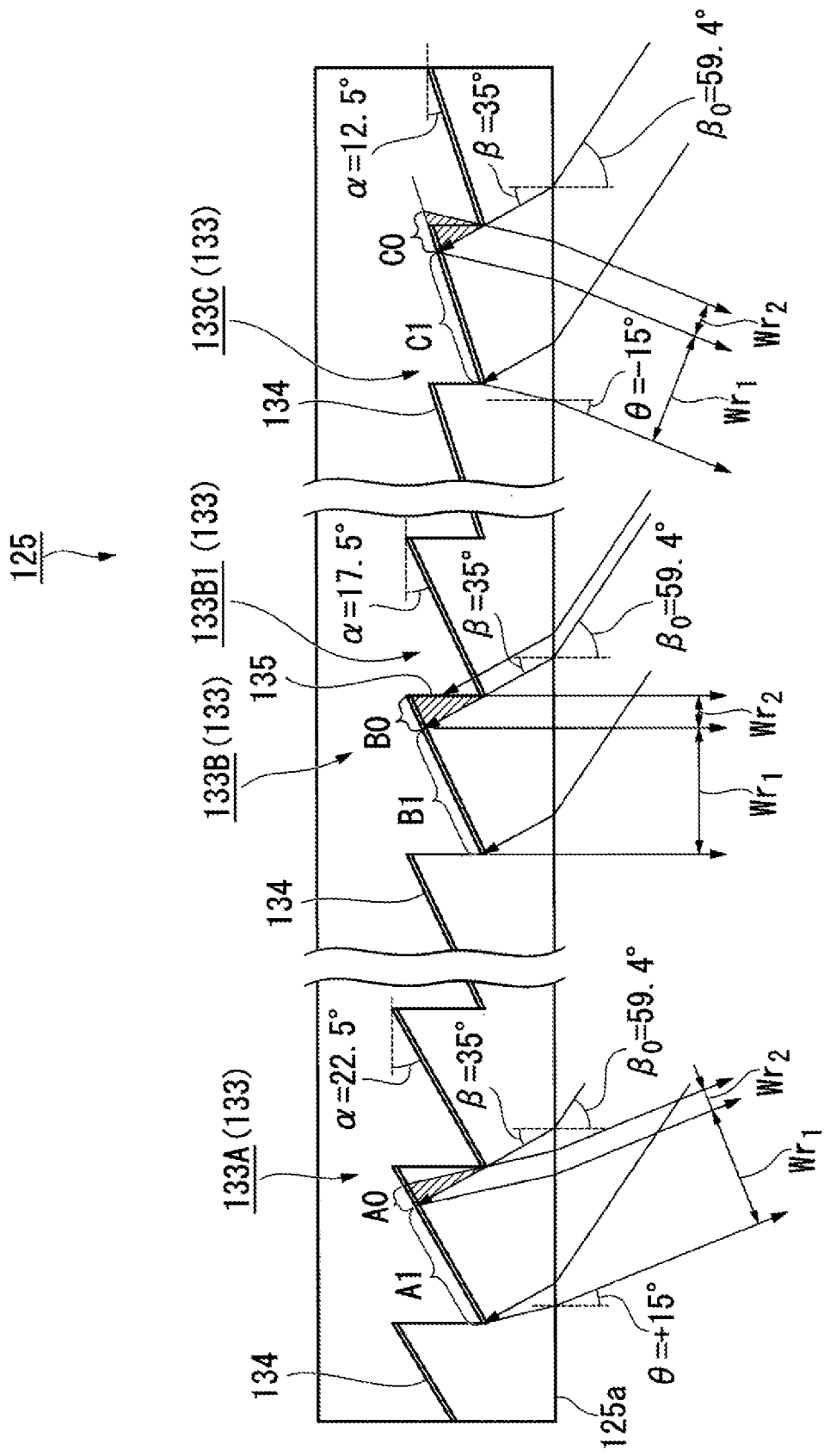
FIG. 6 is a schematic view illustrating a state of reflection of light of three curved mirrors of the optical element.

FIG. 6 is a schematic view illustrating the state of reflection of the light of three curved mirrors 133A, 133B and 133C of the optical element 125.

As illustrated in FIG. 6, the incident angle βO of the light with respect to a first surface 125a of the optical element 125 is 59.4°, and a refraction angle $β_1$ of the light of the first surface 125a is 35°. In the position A on the far side from the image generating unit 11, an inclination angle α of the curved mirror 133A is set to 22.5°, and an exit angle θ of the light from the first surface 125a is set to +15°. In the position B at the center, the inclination angle α of the curved mirror 133B is set to 17.5°, and the exit angle θ of the light from the first surface 125a is set to 0°. In the position C on the near side to the image generating unit 11, the inclination angle α of the curved mirror 133C is set to 12.5°, and the exit angle θ of the light from the first surface 125a is set to −15°.

Here, a reflectance of a partial reflection film 134 used in the curved mirrors 133A, 133B and 133C is set to r (0<r<1). When the curved mirror 133B of the position B is examined, for example, a region of the curved mirror 133B denoted by reference sign B1 is a region where the light enters the curved mirror 133B without entering an adjacent curved mirror 133B1. In the region B1, a relative intensity R1 of the reflected light, given 1 as the intensity of incident light, is R1=r.

In contrast, a region denoted by reference sign B0 is a region not reached by the light that advances toward the curved mirror 133B without entering the adjacent curved mirror 133B1. Given that there is light that reaches the region B0, such light has passed through the adjacent curved mirror 133B1. When light absorbability is imparted to a wall surface 135, for example, the light that passes through the adjacent curved mirror 133B1 is absorbed by the wall surface 135 and does not reach the region B0. In this case, a relative intensity R0 of the reflected light of the region B0 is R0=0. Thus, R1>R0. On the other hand, when the wall surface 135 is light transmissive, the light that passes through the adjacent curved mirror 133B1 enters the region B0 via the wall surface 135 and is partially reflected. In this case, the relative intensity R0 of the reflected light of the region B0 is R0=r×(1−r). Since 0<r<1, R1>R0.

Thus, regardless of the characteristics of the wall surface 135, the relative intensity R1 of the reflected light in the region B1 is greater than a relative intensity R0 of the reflected light in the region B0. That is, when viewed from the eye of the observer, differences in brightness occur between the region B1 and the region B0 in the one curved mirror 133B. This hold true for the curved mirror 133A in position A and the curved mirror 133C in position C as well. Thus, when the observer views the optical element 125, arc-shaped and striped-shaped patterns where a bright region and a dark region are alternately repeated can be seen. Hereinafter, regions A1, B1 and C1 are referred to as bright regions, and regions A0, B0 and C0 are referred to as dark regions.

Given $w_{r1}$ as a width of each of the bright regions A1, B1, C1 when viewed from the exit pupil, and $w_{r2}$ as a width of each of the dark regions A0, B0, C0 when viewed from the exit pupil, a expressed by equation (1) below is defined as the duty ratio.

$$a = w_{r1}/(w_{r1}+w_{r2}) \quad (1)$$

As illustrated in FIG. 6, the duty ratio of the curved mirror 133 is understood to vary according to the position (position A, position B and position C) of the curved mirror 133 inside the optical element 125, that is, according to the viewing angle of the observer.

Given n as the refractive index of the media (first transparent member and second transparent member) of the optical element 125, when η that satisfies the relationship of equation (2) below is used, $$n \times \sin\eta = \sin\theta \quad (2)$$

then the duty ratio a can be expressed by the equation (3) below.

$$a = \cos\beta \cos\eta \quad (3)$$

Figure 7:
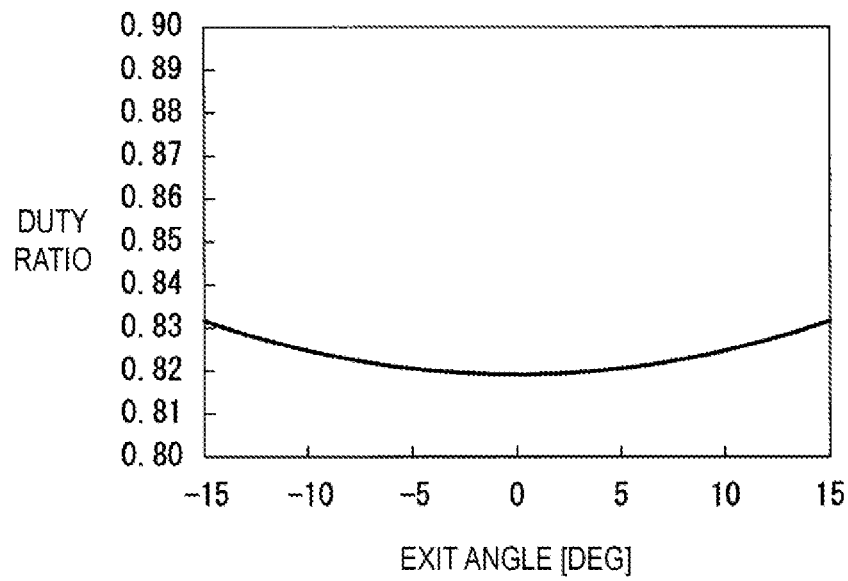
FIG. 7 is a graph showing the relationship between an exit angle of light from the optical element and a duty ratio.

FIG. 7 is a graph showing the relationship between the viewing angle of the observer, that is, the exit angle of the light from the optical element, and the duty ratio. In FIG. 7, the horizontal axis indicates the exit angle θ (deg) of the light, and the vertical axis indicates the duty ratio.

As illustrated in FIG. 7, in this example, the duty ratio varies within a range of substantially from 0.82 to 0.83, and is a minimum value when the exit angle θ is 0°.

Figure 8:
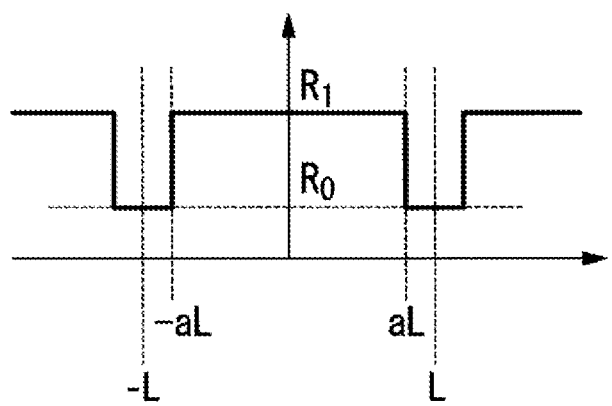
FIG. 8 is a diagram obtained by modeling a stripe-shaped pattern caused by differences in brightness.

Here, to examine how the observer perceives the striped-shaped pattern in which such a duty ratio varies, the inventors assumed a model in which the light intensity varies in a rectangular wave shape, as illustrated in FIG. 8.

When a Fourier series is found from the model of the striped-shaped pattern having this rectangular wave shape, equation (4) is obtained as amplitude.

[Mathematical Equation 1]

$$a_n = 2(R_1 - R_0)\frac{\sin n\pi a}{n\pi} \quad (4)$$

The intensity of the stripe-shaped pattern is perceived by the eye of the observer and thus, taking into consideration primary information alone, an intensity $I_1$ expressed by equation (5) equivalent to the square of the first term of equation (4) is perceived.

[Mathematical Equation 2]

$$I_1 = a_1^2 = 4\frac{(R_1 - R_0)^2}{\pi^2}\sin^2\pi a \quad (5)$$

Figure 9:
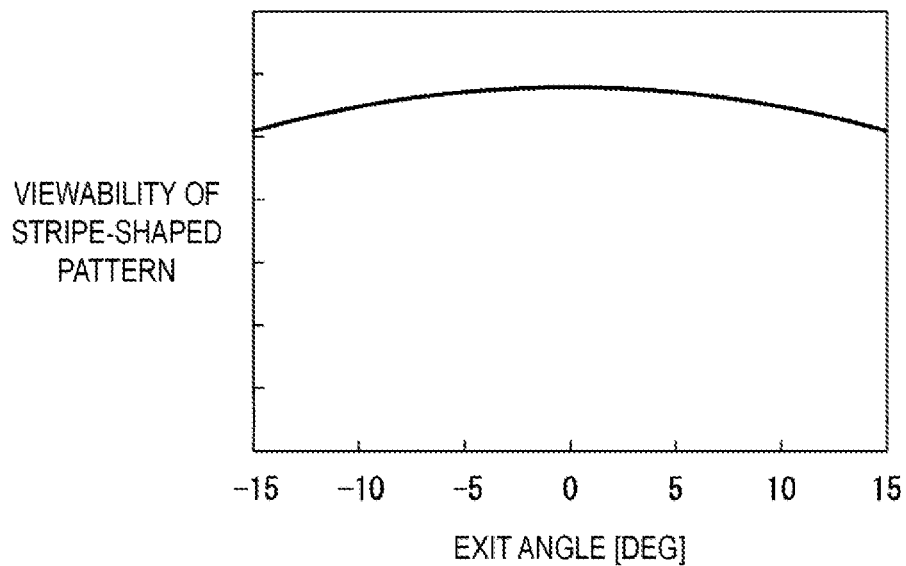
FIG. 9 is a graph showing the relationship between the exit angle of light from the optical element and visual recognizability of the stripe-shaped pattern.

From equation 5, it is understood that, when the duty ratio a is within a range of 0.5<a<1, the striped-shaped pattern intensifies when the duty ratio a decreases, that is, as the duty ratio comes closer to about 0.5. When this striped-shaped pattern is observed, the observer may have a perception that the stripe-shaped pattern exists. Thus, when this optical element is utilized in an HMD, this stripe-shaped pattern is superimposed on the display image and visually recognized. Furthermore, as illustrated in FIG. 9, the problem also arises that the way in which this stripe-shaped pattern appears differs according to the viewing angle of the observer. In this example, when the exit angle θ is 0°, that is, when the observer views the center of the display image, there is a high possibility that the stripe-shaped pattern will be perceived.

Here, the inventors came up with the idea of making the duty ratio constant across the plurality of curved mirrors by varying each of the positions of the plurality of curved mirrors in a thickness direction of the optical element. When a curved mirror is moved in the thickness direction of the optical element, the height of the wall surface can be decreased, thereby making it possible to make the dark region narrower. Based on this concept, it is possible to make the duty ratio constant across the plurality of curved mirrors.

The inventors discovered from a detailed study that, given $η_0$ as η when the exit angle θ of light is maximum (θ=15° in the exemplary embodiment), that is, from equation (2) in the exemplary embodiment, given $η_0$ as the angle $η_0$=arcsin (sin 15°/n), the duty ratio can be made uniform by displacing a given curved mirror from an adjacent curved mirror by an amount equivalent to δz found by equation (6) below.

[Mathematical Equation 3]

$$\delta z(\eta) = 1/\tan \beta (\cos \eta / \cos \eta_0 - 1) \quad (6)$$

Figure 10:
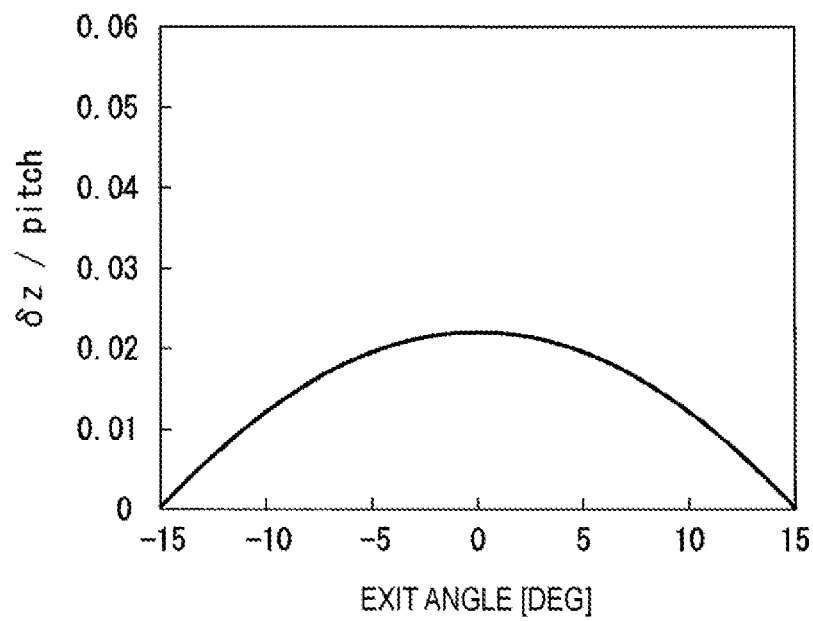
FIG. 10 is a graph showing the relationship between the exit angle of light from the optical element and a position variation of the curved mirror.

FIG. 10 is a graph showing the relationship between the exit angle θ of light and the position variation δz of the curved mirror. In FIG. 10, the horizontal axis indicates the exit angle θ [deg], and the vertical axis indicates the position variation δz/pitch. That is, the value of the position variation δz standardized by the pitch of the curved mirror is set as the vertical axis.

The graph in FIG. 10 indicates that, for example, when the duty ratio of the curved mirror positioned at θ=0° matches the duty ratio of the curved mirror positioned at θ=15°, the curved mirror positioned at θ=0° may be disposed in a position shifted by a distance of 0.022 times the pitch in the thickness direction of the optical element. Thus, the optimized position of each curved mirror can be found by integrating δz.

When equation (6) is integrated, equation (7) below is obtained. That is, equation (6) includes a cosine function and a constant term, and thus, when these are integrated, it can be understood that the position of the curved mirror is expressed by a mathematical equation that adds a sin function and a linear function.

[Mathematical Equation 4]

$$z(\eta) = 1/\tan \beta [(\sin \eta_0 - \sin \eta)/\cos \eta_0 - (\eta_0 - \eta)] \quad (7)$$

Figure 11:
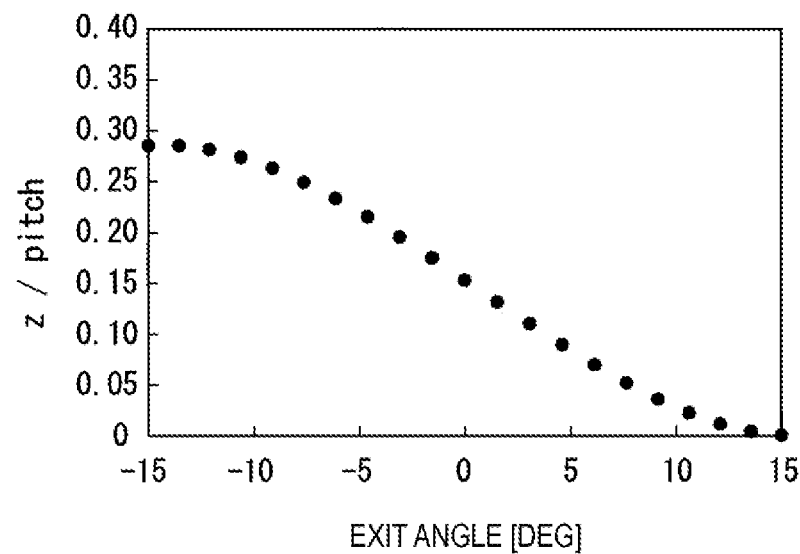
FIG. 11 is a graph showing the relationship between the exit angle of light from the optical element and a position of the curved mirror.

For example, when 21 curved mirrors are disposed at a refraction angle β=35° with the exit angle θ being in a range of ±15° from the optical element that is made from a medium having a refractive index of 1.5, the curved mirrors simply need to be disposed in the positions indicated by the points in FIG. 11. The vertical axis in FIG. 11 is standardized by pitch and thus, when the distance from the exit pupil to the curved mirror is 40 mm, for example, the pitch of the curved mirror is 0.7 mm. Thus, the positions of the curved mirrors at both ends need only by shifted by 0.2 mm.

Based on the above concept, in the case of the optical element 25 of the exemplary embodiment, the position of each of the plurality of curved mirrors 33 in the thickness direction Z varies along the arrangement direction J of the plurality of curved mirrors 33. Given z (η) as the position of the curved mirror 33, equation (6) described above is satisfied.

Where,

β: Refraction angle of light on surface of optical element on observer side

η: η=arcsin (sin η/n)

θ: Exit angle of light from optical element n: Refractive index of medium of optical element $\eta_0$: η in a position where θ is maximum in optical element Further, as illustrated in FIG. 3, in the arrangement direction J of the plurality of curved mirrors 33, a variation $\delta z_1$ between the positions of a first curved mirror 331 positioned in the center portion and a curved mirror adjacent to the first curved mirror 331 is greater than at least a variation $\delta z_2$ between the positions of a second curved mirror 332 positioned at one end portion and a curved mirror adjacent to the second curved mirror 332. In other words, in FIG. 3, the slope of a curve Q that passes through the positions of the plurality of curved mirrors increases in the center portion and decreases at the end portion.

Note that the displacement of the position of the curved mirror 33 in the thickness direction Z may also be applied to only some of the plurality of curved mirrors 33. For example, the positions of only the curved mirrors 33 positioned within a range in which the duty ratio is particularly small, such as within a range in which the exit angle θ is ±5°, may be displaced. In this case, the overall displacement of the plurality of curved mirrors 33 can be decreased to 0.1 mm, making it possible to achieve a thinner optical element 25.

Additionally, when an amount of displacement less than the predetermined amount indicated in FIG. 11 is applied to some of the curved mirrors 33, the display quality and the overall thickness of the curved mirrors 33 can be suitably adjusted. Furthermore, the surface of the optical element 25 can be bent in accordance with the displacement of the curved mirror 33. In this case, a distance from the curved mirror 33 to the surface of the optical element 25 can be made constant, making it possible to decrease the thickness of the optical element 25.

The plurality of curved mirrors 33 may have the same curvature, or may have curvatures that differ from each other. Further, the shape of the curved mirrors 33 may be aspherical, or the aspherical coefficients may differ for each of the curved mirrors 33.

When a width of each of the curved mirrors 33 is too large, while not particularly limited, an increase in the thickness of the optical element 25 results in an increase in weight, and when a width of each of the curved mirrors 33 is too small, the diffraction of light causes a decrease in resolution. From such a viewpoint, the width of each of the curved mirrors 33 is preferably about from 0.1 to 1 mm.

Further, when the refractive index of the first transparent member 31 and the refractive index of the second transparent member 32 greatly differ, see-through light (external light) bends, subjecting the observer to discomfort. Thus, the refractive index of the first transparent member 31 and the refractive index of the second transparent member 32 preferably coincide to the extent possible. Accordingly, the first transparent member 31 and the second transparent member 32 are preferably made from the same material.

As described above, according to the HMD 100 of the exemplary embodiment, the arc-shaped and stripe-shaped patterns caused by a difference in brightness can be made less perceptible by the human eye. This makes it possible to increase the visibility of the display image. For example, the stripe-shaped pattern that appears in the center portion of the image when the position of the eye of the observer is aligned with the center position of the optical element 25 can be made difficult to perceive.

Further, in the exemplary embodiment, because the plurality of curved mirrors 33 are sandwiched between the first transparent member 31 and the second transparent member 32, and the second surface 31b of the first transparent member 31 and the second surface 32b of the second transparent member 32 are mutually parallel, the incident angle of light with respect to the curved mirror 33 does not vary even when the light is repeatedly reflected by these surfaces. Thus, it is possible to maintain an amount of light emitted from each of the curved mirrors 33 toward the eyes of the observer.

Further, in the exemplary embodiment, each of the plurality of curved mirrors 33 includes the partial reflection film 34, making it possible to control the characteristics of each of the curved mirrors 33, such as reflectance and transmittance, by suitably adjusting the specifications of the partial reflection film 34.

Further, in the exemplary embodiment, the projection optical system 13 includes the concave mirror 24, and thus divergence of the light that enters the optical element 25 can be adjusted by suitably adjusting the shape of the concave mirror 24. For example, the duty ratio of each of the curved mirrors 33 can be made easier to control to a preferred value by introducing parallel light into the optical element 25. Further, when use of a lens in the projection optical system is presumed, the lens has dispersion, resulting in problems such as chromatic aberration and/or an increase in device size. In order to address them, in the exemplary embodiment, the concave mirror 24 is used, making it possible to suppress such chromatic aberration and/or achieve the HMD 100 that is small and light weight.

Note that the technical scope of the invention is not limited to the above-described exemplary embodiments, and various modifications can be made to the above-described exemplary embodiments without departing from the spirit and gist of the invention.

For example, while the optical element and the concave mirror constituting the projection optical system are made from separate members in the exemplary embodiment described above, the optical element and the concave mirror may be made as an integrated member. According to this configuration, it is possible to easily maintain an alignment accuracy of the optical element and the concave mirror.

Further, while the above exemplary embodiment has described an example in which, among the plurality of curved mirrors, the curved mirror at the center has a smaller duty ratio than the duty ratio of the curved mirror at the end portion, and thus has a greater variation in the position of the curved mirror at the center than the curved mirror at the end portion, the duty ratio of the curved mirror at the center is not necessarily limited to be small due to causes such as the incident angle of the light with respect to the optical element, and the positional relationship between the plurality of curved mirrors and the exit pupil. For example, when the center of the display image differs from the center of the plurality of curved mirrors, the duty ratio of the curved mirror at the end portion on the far side from the image generating unit or on the near side to the image generating unit may be less than that of the others. In this case as well, the variation in the position of the curved mirror at the position having a small duty ratio need only be increased.

Additionally, the specific configurations of the constituent elements of the display device, such as quantities, arrangements, shapes, and materials, are not limited to those described in the above exemplary embodiment, and may be changed as appropriate.

The entire disclosure of Japanese Patent Application No. 2017-244086, filed Dec. 20, 2017 is expressly incorporated by reference herein.

What is claimed is:

1. A display device comprising: an image generating unit configured to emit light including image information; and a projection optical system configured to guide light from the image generating unit toward an exit pupil and generate an image by the light in a position of the exit pupil, wherein the projection optical system includes an optical element provided with a plurality of curved mirrors configured to reflect a portion of the light toward the exit pupil and transmit the other portion of the light, and the plurality of curved mirrors are arranged in a first direction, and the plurality of curved mirrors are configured so that the curved mirror positioned on a far side from the image generating unit has an inclination greater than that of the curved mirror positioned on a near side to the image generating unit, and the plurality of curved mirrors include a curved mirror positioned, with respect to a top flat surface of the optical element, at $z(\eta)$ that satisfies equation (1) below, in a second direction equivalent to a thickness direction at the optical element:

$$z(\eta) = 1 \text{ mm}/\tan \beta [(\sin \eta - \sin \eta_o)/\cos \eta_o - (\eta_o - \eta)]$$

where,
$\beta$: Refraction angle of light on surface of optical element on observer side;
$\eta$: $\eta = \arcsin(\sin \theta / n)$;
$\theta$: Exit angle of light from optical element;
$n$: Refractive index of medium of optical element;
$\eta_o$: $\eta$ in a position where $\theta$ is maximum in optical element.

2. The display device according to claim 1, wherein the plurality of curved mirrors include a first curved mirror positioned at a center portion in the first direction, and a second curved mirror positioned at one end portion in the first direction, and
a variation between a position of the first curved mirror in the second direction and a position of a curved mirror adjacent to the first curved mirror in the second direction is greater than a variation between a position of the second curved mirror in the second direction and a position of a curved mirror adjacent to the second curved mirror in the second direction.

3. The display device according to claim 1, wherein the plurality of curved mirrors are sandwiched between a first transparent member and a second transparent member, and
the first transparent member and the second transparent member include surfaces opposite to surfaces facing each other that are mutually parallel flat surfaces.

4. The display device according to claim 1, wherein the plurality of curved mirrors each include a partial reflection film configured to reflect a portion of the light, and transmit the other portion of the light.

5. The display device according to claim 1, wherein the projection optical system further includes a concave mirror configured to reflect light from the image generating unit toward the optical element.

6. The display device according to claim 5, wherein the optical element and the concave mirror are made as an integrated member.

* * * * *